Oct. 22, 1935.                S. P. SHACKLETON                2,017,923
                              GAIN CONTROL APPARATUS
                              Filed Sept. 24, 1932
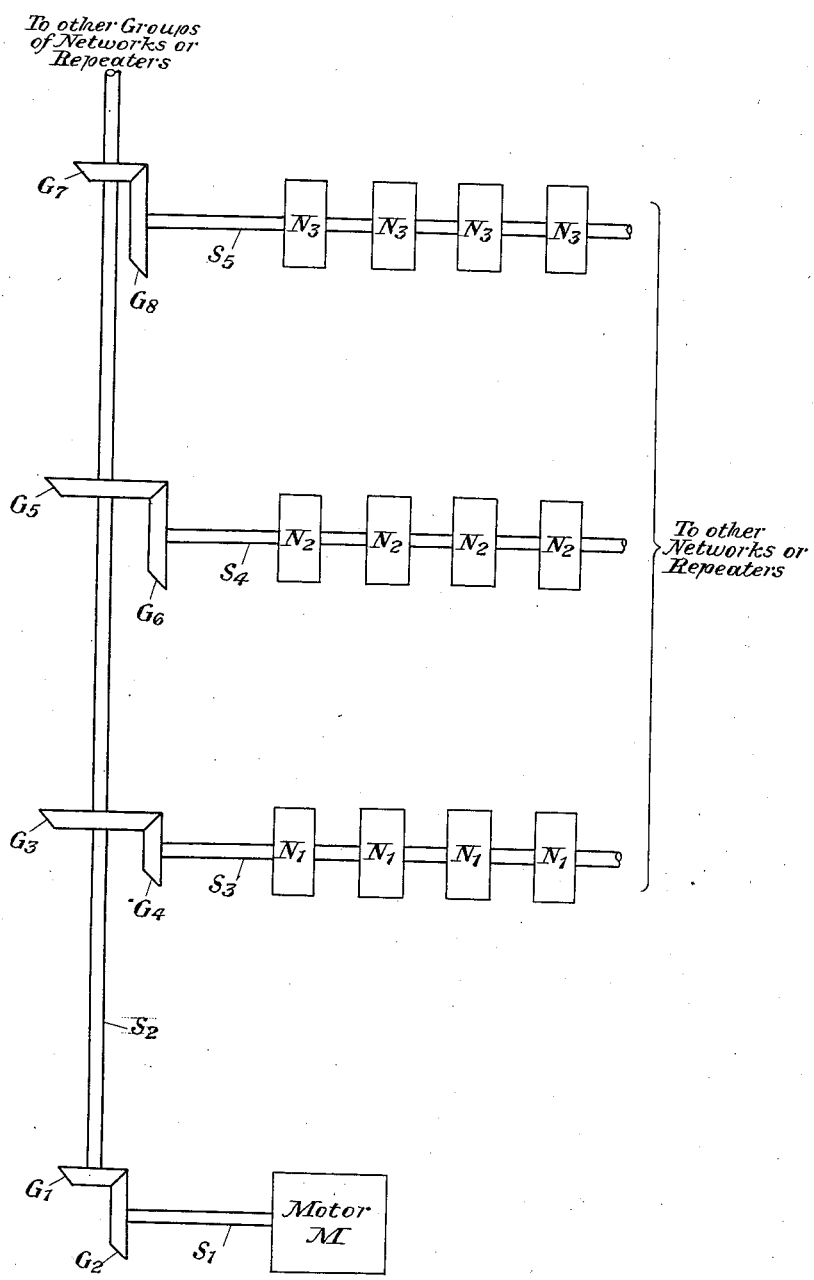
INVENTOR
S. P. Shackleton
BY
ATTORNEY Patented Oct. 22, 1935

2,017,923

UNITED STATES PATENT OFFICE 2,017,923

GAIN CONTROL APPARATUS

Samuel P. Shackleton, Wyoming, N. J., assignor to American Telephone and Telegraph Company, a corporation of New York Application September 24, 1932, Serial No. 634,775

1 Claim. (Cl. 178—44)

This invention relates to electrical networks and particularly to those networks employed for regulating the gain of amplifiers used in connection with telephone repeatered lines.

This invention, as will be seen from the description given herein below, when read in connection with the accompanying drawing, discloses a system of regulation of amplifiers, or repeaters, in which various degrees of regulation can be applied to different amplifiers or groups of amplifiers, all under the control of one master regulator. In the present art it is necessary to conform to an arbitrary standard in that regulators are designed for certain lengths of line, and it is necessary to use separate master regulators for different groups of circuits having substantially different characteristics, such as might be caused by relatively large differences in length.

It should be borne in mind that the following description and the accompanying drawing are for the purpose of illustrating one arrangement for applying the invention and this employs a form of gearing and yet the use of other arrangements for accomplishing the same purpose, such as, for instance, the substitution of other means of changing the relative degrees of rotation of the various shafts for the use of gearing, shall not depart from the sense of the invention as outlined by the following description and drawing when read in connection with the appended claim.

With reference to the attached drawing, the regulating system provided by this invention is shown to be composed of various banks of regulating networks a characteristic of which is changed by means of a rotary switch or switches each associated with groups of networks, these networks being associated with the individual amplifiers (not shown) which it is desired to control, and means for driving these banks of regulating networks at relatively different speeds. In order to accomplish this, a motor M, under control of a master regulator (not shown), is caused by the said master regulator to rotate in one direction or the other when it is necessary to change the gain of the associated circuits or networks in one direction or the other. In the systems previously employed the amount of change introduced to the driven networks has been the same for all circuits associated with a given master regulator, thus necessitating a different master regulator for each group of circuits or networks which often had substantially different characteristics, or accepting a condition of over-regulation or under-regulation on certain circuits in case an additional master could not be justified economically.

In the system as described herewith, it is possible to correct different circuits or groups of circuits in different amounts with great flexibility. This purpose can be accomplished in the following manner: Motor M drives a shaft $S_1$ and, through the agency of gears $G_1$ and $G_2$, it also drives a shaft $S_2$. Shaft $S_2$ then drives various groups of regulating networks $N_1$—$N_1$, $N_2$—$N_2$ and $N_3$—$N_3$, through a set of change gears and a common shaft for the networks of each group. For instance, gear combination $G_5$ and $G_6$ drives the various networks of group $N_2$ through shaft $S_4$, and gear combination $G_7$ and $G_8$ drives the various networks of group $N_3$ through shaft $S_5$. By selecting the various gear combinations so that they have the proper ratio, it is possible to cause any of the groups of networks to be changed by a predetermined amount. In other words, a change in the ratio of the gear combination will change the range of regulation of the associated group of networks.

In the manner of operation described, it is possible to have a regulating system which is uniform for various types of applications except that various combinations of change gears can be made available in order to afford different degrees of regulation on different circuits or groups of circuits or networks whenever desired. Circuit groups which are entering and leaving at points on a cable such that they would be only partially regulated by the usual system, can, by overdrive, be caused to vary sufficiently in gain, due to changes of gain of those repeaters that are in the regulated cable, to compensate fully for all required gain changes, whether in or out of the regulated cable section, and thus the circuit can always be fully regulated.

Similarly, for a circuit not as long as the normal regulated circuits, on which the correction applied to them by the normal regulation would be excessive, the use of under-drive permits regulation less than for the majority of circuits so that the gain on these circuits is changed by the proper smaller amount.

While this invention is shown and described in certain particular embodiments merely for the purpose of illustration, it will be understood that the general principles of this invention may be applied to other and widely varied arrangements without departing from the spirit of the invention and the scope of the appended claim.

What is claimed is:

The combination of a plurality of repeaters which have different ranges of variation in gain, and means for simultaneously controlling the gains of all of said repeaters over their entire operating ranges, said means consisting of a plurality of pairs of gears, one of the gears of each of the various pairs being mounted concentrically about a common shaft, the other gear of each of the various pairs being coupled to a corresponding repeater, the two gears of each pair having selected diameters corresponding to the range of variation of the associated repeater.

SAMUEL P. SHACKLETON.